United States Patent [19]
Jakubowski, Jr.

[11] 3,787,012
[45] Jan. 22, 1974

[54] INTERNAL EJECTOR MECHANISM FOR STACKED SEQUENTIALLY RELEASABLE SEPARABLE UNITS

[75] Inventor: Thaddeus Jakubowski, Jr., Long Beach, Calif.

[73] Assignee: McDonnell Douglas Corporation, Santa Monica, Calif.

[22] Filed: Feb. 5, 1973

[21] Appl. No.: 329,660

[52] U.S. Cl.......... 244/137 R, 89/1.5 R, 294/83 AE
[51] Int. Cl............................................ B64d 1/04
[58] Field of Search............... 89/1 B, 1.5 R, 1.5 F; 244/137 R, 151 B; 294/83 AE, 83 AA, 83 A; 60/26.1

[56] References Cited
UNITED STATES PATENTS

| | | | |
|---|---|---|---|
| 3,623,759 | 11/1971 | Adler | 294/83 AE |
| 3,373,656 | 3/1968 | Kriesel | 89/1 B |
| 3,087,697 | 4/1963 | Potts | 244/137 R |
| 2,796,284 | 6/1957 | Benson et al. | 294/83 AA |
| 2,726,576 | 12/1955 | Musser | 244/137 R |
| 3,010,752 | 11/1961 | Geffner | 244/137 R |

FOREIGN PATENTS OR APPLICATIONS

| | | | |
|---|---|---|---|
| 618,809 | 3/1961 | Italy | 294/83 AA |
| 1,199,093 | 12/1959 | France | 244/137 R |

*Primary Examiner*—Duane A. Reger
*Assistant Examiner*—Galen L. Barefoot
*Attorney, Agent, or Firm*—Robert O. Richardson; Walter J. Jason; Donald L. Royer

[57] ABSTRACT

An internal ejector mechanism for releasably fastening stacked and sequentially separable units to a carrier unit. The carrier unit contains a mounting bracket or lug having a plurality of latching balls radially movable through its cylindrical walls. When the balls are urged outwardly by a ball retention plunger they fit within a groove in the ejector housing in the separable unit to lock it to the carrier unit. A cartridge actuated piston in the separable unit moves the ball retention plunger to permit inward movement of the balls, freeing the ejector housing and releasing the separable unit.

The stacked separable units are interchangeable and provide for sequential release starting with the outermost unit. Each separable unit has a threaded cavity liner in which a disposable ejector fits. The ejector consists of a cylinder threaded into the liner, an ejector piston movable within the cylinder, an explosive cartridge, a plunger actuator and cartridge cap with electrical contacts.

Each separable unit has at its outer, lower or other end to which an additional unit may be attached a further locking arrangement to prevent piston movement within the cylinder when such additional unit is attached. This locking arrangement also includes locking balls between a lower lug threaded into the cylinder and the movable piston within the cylinder. A plunger within the lug keeps the balls moved outwardly into the cylinder grooves until the plunger is moved upwardly by the separation of the outermost separable unit. Thus, release of the outermost separable unit releases the piston in the innermost separable unit for movement and subsequent release of the innermost separable unit.

9 Claims, 2 Drawing Figures

3,787,012

INTERNAL EJECTOR MECHANISM FOR STACKED SEQUENTIALLY RELEASABLE SEPARABLE UNITS

BACKGROUND OF THE PRESENT INVENTION

Externally carried stores on aircraft require heavy rugged suspension systems to carry the stores, particularly at high speed and when subjected to heavy drag. When the stores have been expended these suspension systems still cause drag, thus penalizing the aircraft in range, speed, maneuverability and other factors.

There is a need for an expendable ejector system for stacked external stores carried by an aircraft that will sequentially expend the stores. Such a system must be free from the aforementioned problems and yet be safe and reliable in use.

RELATED INVENTIONS

This application is similar to that of co-pending application Ser. No. 329,657, filed Feb. 5, 1973, for Internal Ejector Mechanism by this inventor and having a common assignee.

SUMMARY OF THE PRESENT INVENTION

This is an internal ejector mechanism for releasably fastening stacked and sequentially separable units to a carrier unit. The carrier unit contains a mounting bracket or lug having a plurality of latching balls radially movable through its cylindrical walls. When the balls are urged outwardly by a ball retention plunger they fit within a groove in the ejector housing in the separable unit to lock it to the carrier unit. A cartridge actuated piston in the separable unit moves the ball retention plunger to permit inward movement of the balls, freeing the ejector housing and releasing the separable unit.

The stacked separable units are interchangeable and provide for sequential release starting with the outermost unit. Each separable unit has a threaded cavity liner in which a disposable ejector fits. The ejector consists of a cylinder threaded into the liner, an ejector piston movable within the cylinder, an explosive cartridge, a plunger actuator and cartridge cap with electrical contacts.

Each separable unit has at its outer, lower or other end to which an additional unit may be attached a means to prevent piston movement within the cylinder when such additional unit is attached. This means also includes locking balls between a lower lug threaded into the cylinder and the movable piston within the cylinder. A plunger within the lug keeps the balls moved outwardly into the cylinder grooves until the plunger is moved upwardly by the separation of the outermost separable unit. Thus, release of the outermost separable unit releases the piston in the innermost separable unit for movement and subsequent release of the innermost separable unit.

DETAILED DESCRIPTION OF AN ILLUSTRATIVE EMBODIMENT

Figure 1:
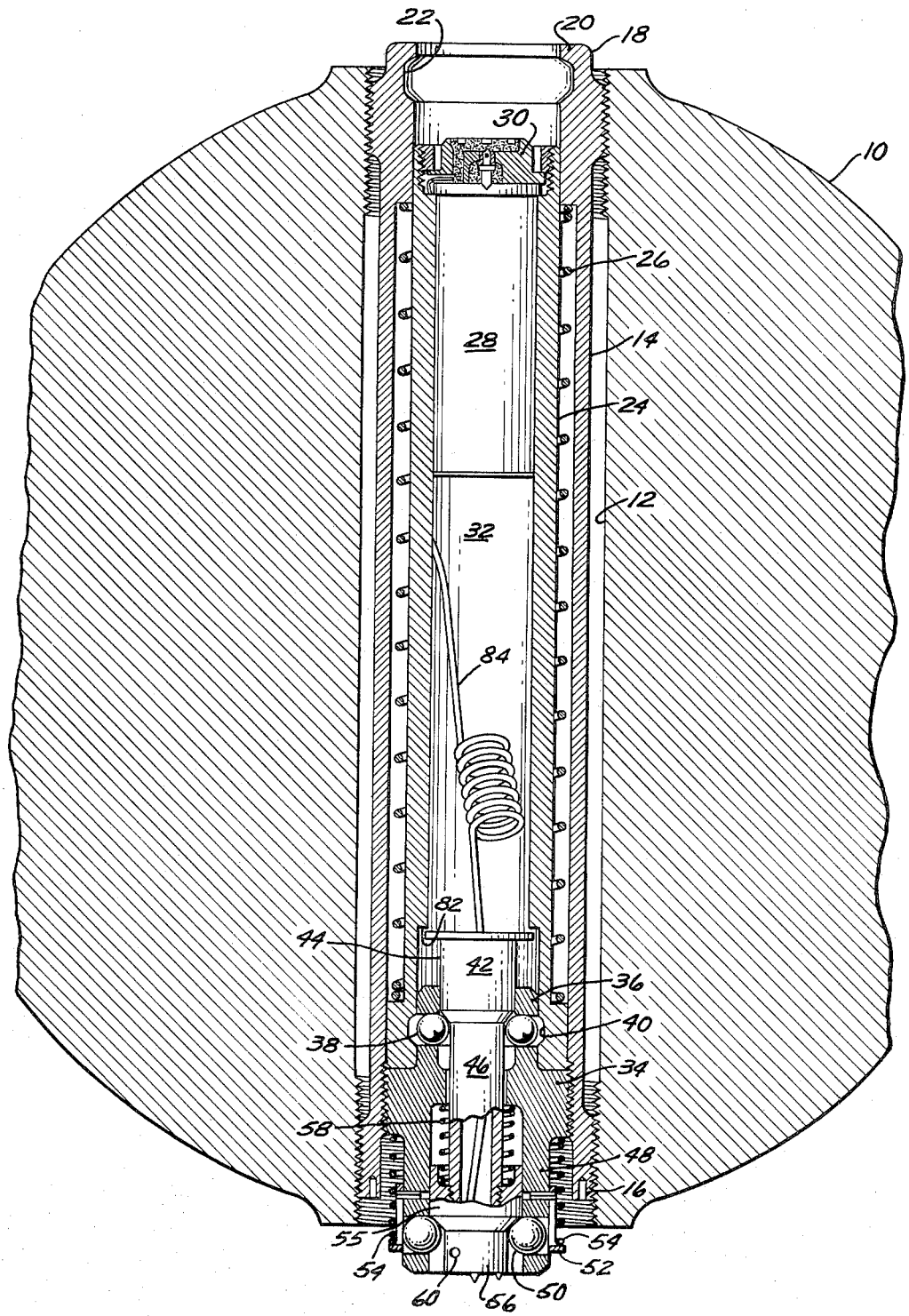
FIG. 1 is an elevational sectional view of a separable unit having an internal ejector mechanism therein.

Referring now to FIG. 1 there is shown an externally carried store 10 having a bore 12 extending diametrically through its center of gravity. A cylinder 14 is threaded in the bore 12 and has recesses 16 in its bottom surface to permit rotation thereof for vertical adjustment and to tighten the store against aircraft swaybrace structure as will be explained hereinafter.

Figure 2:
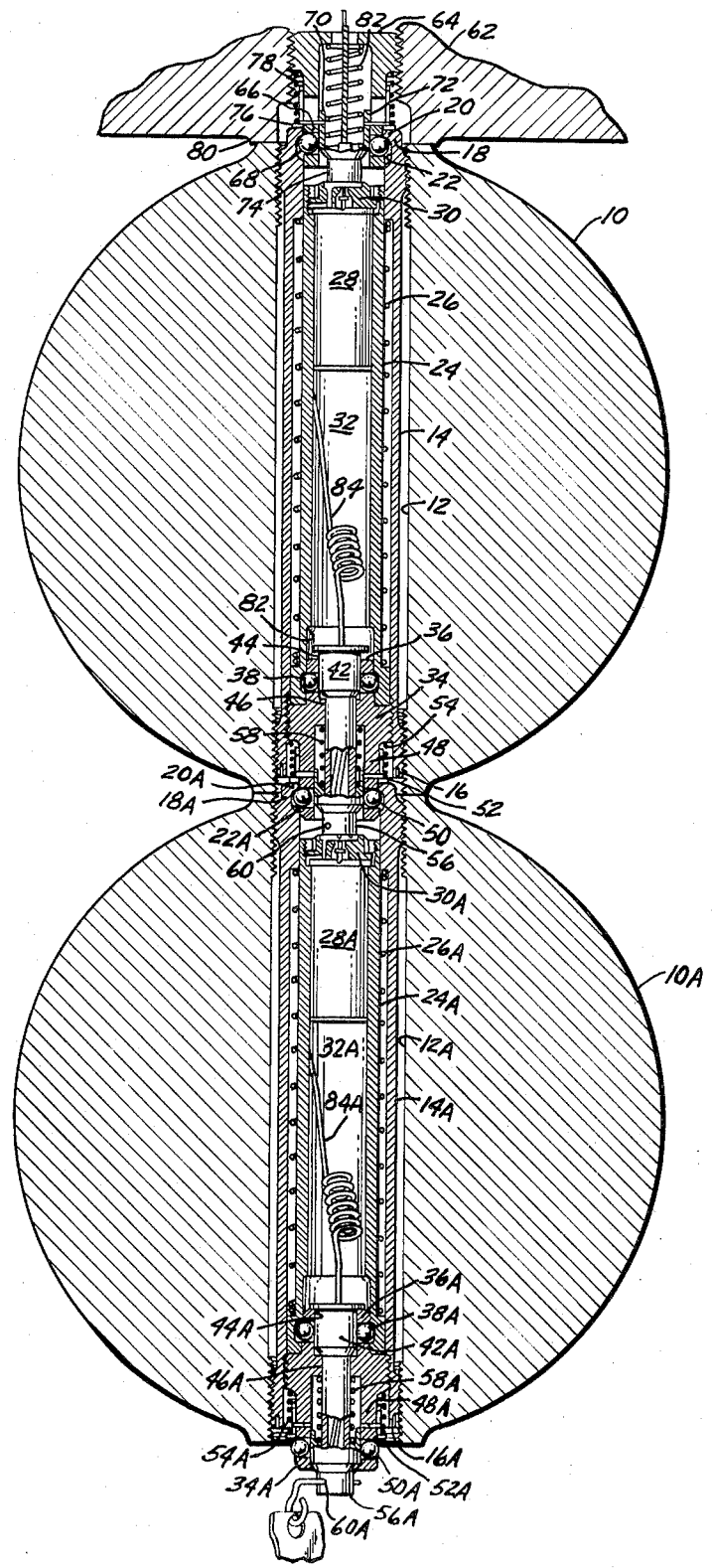
FIG. 2 is an elevational sectional view of a pair of stacked separable units attached to a carrier unit.

This cylinder 14 terminates at the top in an ejector housing ring 18 within an inturned flange 20 to define an ejector housing groove 22. This groove will receive locking balls in the carrier unit lug or attaching lug on another store, as can be seen in FIG. 2.

Within cylinder 14 is a longitudinally movable ejector piston 24 spring-urged downwardly by retraction spring 26. This piston is hollow with a cartridge 28 and a plunger actuator 30 at its top. This actuator is threadedly removable for the insertion or replacement of cartridges. The expanding gases from an actuated cartridge fills the air chamber 32 and urges piston 24 and piston actuator 30 upwardly to release the store, as will be explained hereinafter with reference to FIG. 2.

There is a safety provision to prevent release of store 10 if there is another store suspended from it. This structure includes an attaching lug 34 threadedly mounted at the bottom of cylinder 24. This lug has a cylindrical upper portion 36 with openings to receive locking balls 38 which may be outwardly movable to engage an ejector piston groove 40 to prevent upward movement of ejector piston 24 for release of store 10.

Within lug 34 and adapted for vertical movement is a manual release and safety plunger 42 having an upper enlarged diameter shaft 44 and upper reduced diameter shaft 46. The vertical position of plunger 42 determines whether its larger diameter shaft 44 moves balls 38 into groove 40 or whether its smaller diameter shaft 46 permits balls 38 to move inwardly from the groove to permit piston movement.

Attaching lug 34 has a downwardly extending cylindrical wall 48 with locking balls 50 in openings in the wall which are adapted for outward movement in locking another store to the first one. A ball retainer collar 52 is spring-urged downwardly by spring 54 to keep the balls positioned inwardly until the ejector housing ring 18A on the second store moves the collar 52 upwardly to permit outward locking movement of the balls into the ejector housing groove 22A on the second store. Plunger 42 has a lower enlarged diameter shaft 55 and a lower reduced diameter shaft 56. These shafts mate with locking balls 50 in the same manner that upper shafts 44 and 46 cooperate with locking balls 38. Downward movement of plunger 42 presses the enlarged shaft 54 against the balls 50 and upward movement of plunger 42 permits the balls 50 to move inwardly against reduced shaft 56 to release the second store. Plunger spring 58 urges plunger 42 downwardly for locking of the second store when the ball retainer collar 52 is moved upwardly by the ejector housing ring 18A on the second store.

A flag attach hole 60 in shaft 56 permits insertion of a pin when the shaft is moved downward. This disarms the store by preventing upward movement of plunger 42 to unlock piston 24 to permit its upward movement to release the store. The pin is removed and the plunger 42 is moved upwardly, as shown, to arm the store and ready it for release. This arming occurs just as takeoff time and is done by a member of the ground crew.

Referring now to FIG. 2, there is shown a pair of stores 10, 10A suspended from aircraft 62 which has a mounting lug 64 threadedly fastened thereto. This lug 64 has a downwardly extending cylindrical wall 66 with openings in the bottom for retaining laterally movable locking balls 68. A plunger 70 with a larger diameter shaft 72 and a smaller diameter shaft 74 is vertically movable within the cylindrical wall 66 for moving the balls 68 laterally to locking and unlocking positions. Spring 75 urges plunger 70 downwardly. A ball retainer collar 76 is downwardly urged by spring 78 to urge the balls inwardly.

An explanation of the operation of loading and unloading of the stores will explain the function and operation of the various parts. Store 10 is first loaded with an upward movement of the ejector housing ring 18 against the ball retainer collar 76. Plunger 70 moves downward due to spring 75. This moves locking balls 68 outwardly into groove 22 in housing ring 18 to secure store 10 to aircraft 62. A spanner wrench, not shown, may be applied to recesses 16 to rotate cylinder 14 within store 10 to raise the store snugly against the sway bracing structure 80 on the aircraft. If only store 10 is to be used, it is armed, i.e., made operable, by removing a safety pin from opening 60 in lower plunger 42 and pushing plunger 42 upward. Balls 38 move inward against the smaller shaft 46 to release piston 24 from lug 34 to permit its upward movement upon actuating cartridge 28. When cartridge 28 is fired, plunger 70 moves up and balls 68 move inwardly against smaller shaft 74 to free store 10 from the aircraft 62. The expanding gases from cartridge 28 force ejector piston upward giving the store 10 an additional ejection force.

To disarm store 10, such as when the aircraft returns for refueling but still keeps the store, collar 52 is pushed upward, allowing plunger 42 to move down, locking balls 38 to piston 24 to prevent its vertical movement.

To remove store 10 from the aircraft manually, plunger 42 is pushed upwardly to arming position, such as shown in FIG. 1. At this point the top of plunger 42 is positioned against a shoulder 82 on piston 42. Then, additional upward movement will move piston 24 upwardly, it being noted that piston 24 is already free from lug 34. And, as previously mentioned, upward movement of piston 24 releases store 10 from the aircraft 62.

Now, assume that store 10 is already hung from the aircraft and it is desired that store 10A be attached to it as shown in FIG. 2. Store 10 is first armed by pushing plunger 42 upwardly to the position shown in FIG. 1. The ball retainer collar 52 drops down to hold balls 50 against the smaller shaft 56. Then ring 18A of store 10A is raised against the collar 52, moving it upward. Balls 50 then move outwardly into groove 22A to secure store 10A to store 10. A spanner wrench, not shown, in recesses 16A may be used to rotate cylinder 14A to tighten store 10A against store 10. The arming, disarming, firing and manual removal of store 10A is identical to that described for store 10 so this description need not be again repeated.

The sequential detonation of cartridge 28A in lower store 10A and cartridge 28 in upper store 10 is done electrically. Cable 82 leads from an electrical power source in aircraft 62 and connects with plunger 70 which contacts plunger actuator 30. One lead from actuator 30 contacts cartridge 28. Another lead connects with plunger 42 through connector 84. Plunger 42 electrically connects with plunger actuator 30A in lower store 10A. This actuator has a lead contacting cartridge 28A. Since stores 10 and 10A must be identical and interchangeable, connector 84A extends between actuator 30A and plunger 42A in store 10A. The electrical switching to disarm electrically the upper store until the lower store has been released is not shown or described since it is not deemed to be necessary. It is not part of the claimed invention and this feature can be constructed by one skilled in the art without inventive effort.

Having thus described an illustrative embodiment of the present invention, it is to be understood that modifications thereof will become apparent to those skilled in the art and it is to be understood that these deviations are to be construed as part of the present invention.

I claim:

1. An internal ejector mechanism for stacked sequentially releasable separable units for fastening to a carrier unit comprising:
   a disposable ejector cylinder within said separable unit,
   a piston movably mounted within said cylinder with a cartridge therein and a movable plunger actuator thereover,
   said cylinder terminating at its upper end in an ejector housing ring with an inwardly directed groove to receive outwardly movable locking balls on said carrier unit,
   said cylinder having a lug fastened to its lower end,
   said lug having a cylindrical upper portion with openings therethrough to receive piston locking balls therein,
   said piston having an inwardly directed piston locking groove at the bottom thereof to receive said piston locking balls when outwardly moved to prevent movement of said piston within said cylinder,
   a plunger vertically movable within said lug, said plunger having a shaft of reduced diameter to permit inward movement of said piston locking balls out of said piston locking groove, and
   spring means urging said plunger downwardly to retain said piston locking balls in said piston locking groove.

2. An internal ejector mechanism as in claim 1 wherein said lug has a cylindrical lower portion with openings therein to receive separable unit locking balls therein for radial movement,
   said plunger having a second shaft of reduced diameter to permit inward movement of said separable unit locking balls,
   said separable unit locking balls being movable outwardly upon downward movement of said plunger to engage the inwardly directed groove of an ejector housing ring of another separable unit when positioned therebelow.

3. An internal ejector mechanism as in claim 2, and a vertically movable ball retainer collar over said separable unit locking balls to retain them inwardly when said plunger is moved upwardly without another separable unit positioned therebelow.

4. An internal ejector mechanism as in claim 2 in combination with a second separable unit attached thereto.

5. An internal ejector mechanism as in claim 4 wherein the first of said separable units remains fastened to said carrier unit when the second separable unit is detached therefrom.

6. An internal ejector mechanism as in claim 5 wherein said piston remains locked to said cylinder in the first of said separable units when said second separable unit is attached thereto.

7. An internal ejector mechanism as in claim 1 wherein said carrier unit is an aircraft and said separable unit is an externally mounted store, the cylinder mounted therein passing through the center of gravity thereof.

8. An internal ejector mechanism as in claim 7 wherein said cylinder is threadedly mounted in said separable unit whereby threaded adjustment regulates spacing between said units when fastened together.

9. An internal ejector mechanism as in claim 8 wherein said cylinder may be rotated for threaded adjustment when said units are fastened together.

* * * * *